United States Patent
Haah et al.

(10) Patent No.: US 11,132,617 B2
(45) Date of Patent: Sep. 28, 2021

(54) QUANTUM SIMULATION OF REAL TIME EVOLUTION OF LATTICE HAMILTONIANS

(71) Applicant: Microsoft Technology Licensing, LLC, Redmond, WA (US)

(72) Inventors: Jeongwan Haah, Redmond, WA (US); Matthew B. Hastings, Seattle, WA (US); Robin Kothari, Seattle, WA (US); Guang H. Low, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 573 days.

(21) Appl. No.: 16/020,715

(22) Filed: Jun. 27, 2018

(65) Prior Publication Data
US 2020/0143280 A1 May 7, 2020

Related U.S. Application Data

(60) Provisional application No. 62/609,651, filed on Dec. 22, 2017.

(51) Int. Cl.
*G06N 10/00* (2019.01)
*B82Y 10/00* (2011.01)
*G06F 15/16* (2006.01)

(52) U.S. Cl.
CPC .............. *G06N 10/00* (2019.01); *B82Y 10/00* (2013.01); *G06F 15/16* (2013.01)

(58) Field of Classification Search
CPC .......... G06N 10/00; B82Y 10/00; G06F 15/16
See application file for complete search history.

(56) References Cited

U.S. PATENT DOCUMENTS

2006/0123363 A1 6/2006 Williams et al.
2015/0006597 A1 1/2015 Troyer et al.

FOREIGN PATENT DOCUMENTS

WO   WO 2016/011440   1/2016

OTHER PUBLICATIONS

Berry et al., "Simulating Hamiltonian Dynamics with a Truncated Taylor Series," *Physical Review Letters*, vol. 114, pp. 1-5 (Mar. 2015).
Childs et al., "Toward the first quantum simulation with quantum speedup," arXiv:1711.10980v1, pp. 1-63 (Nov. 2017).
Hastings, "Lieb-Schultz-Mattis in Higher Dimensions," arXiv:cond-mat/0305505v6, pp. 1-14 (Feb. 2004).
Hastings, "Locality in Quantum Systems," arXiv:1008.5137v1, pp. 1-26 (Aug. 2010).
Hastings et al., "Spectral Gap and Exponential Decay of Correlations," arXiv:math-ph/0507008v3, pp. 1-23 (Dec. 2005).
(Continued)

*Primary Examiner* — Matthew L Reames
(74) *Attorney, Agent, or Firm* — Klarquist Sparkman, LLP

(57) ABSTRACT

Embodiments of the disclosed technology concern a quantum circuit configured to implement a real time evolution unitary of a Hamiltonian in a quantum computing device, wherein a unit time evolution unitary operator is decomposed into overlapping smaller blocks of unitary operators. In some implementations, (a) the size of the overlap is proportional to the logarithm of a number of qubits in the simulated system, (b) the size of the overlap is proportional to the logarithm of a total simulated evolution time, and/or (c) the size of the overlap is proportional to a Lieb-Robinson velocity.

19 Claims, 7 Drawing Sheets

(56) References Cited

OTHER PUBLICATIONS

Lieb et al., "The Finite Group Velocity of Quantum Spin Systems," *Comm. in Mathematical Physics*, vol. 28, Issue 3, pp. 251-257 (Sep. 1972).

Low et al., "Optimal Hamiltonian Simulation by Quantum Signal Processing," *Physical Review Letters*, vol. 118, pp. 1-5 (Jan. 2017).

Michalakis, "Stability of the Area Law for the Entropy of Entanglement," arXiv:1206.6900v2, pp. 1-8 (Jul. 2012).

Nachtergaele et al., "Lieb-Robinson Bounds and the Exponential Clustering Theorem," arXiv:math-ph/0506030v3, pp. 1-12 (Aug. 2005).

Osborne, "The Dynamics of 1D Quantum Spin Systems Can Be Approximated Efficienty," arXiv:quant-ph/0508031v2, pp. 1-4 (Aug. 2006).

Suzuki, "General theory of fractal path integrals with applications to many-body theories and statistical physics," *Journal of Mathematical Physics*, vol. 32, Issue 2, pp. 400-407 (Feb. 1991).

Trotter, "On the Product of Semi-Groups of Operators," *Proc. American Mathematical Society*, pp. 545-551 (Aug. 1959).

Berry et al., "Simulating Hamiltonian dynamics with a truncated Taylor series," arXiv:1412.4687v1, 5 pp. (Dec. 2014).

Haah et al., "Quantum algorithm for simulating real time evolution of lattice Hamiltonians," arXiv:1801.03922v3, 33 pp. (Sep. 2018).

International Search Report and Written Opinion dated Apr. 3, 2019, from International Patent Application No. PCT/US2018/065312, 15 pp.

Low et al., "Optimal Hamiltonian Simulation by Quantum Signal Processing," arXiv:1606.02685v2.

Portugal et al., "Staggered quantum walks with Hamiltonians," *Physical Review A*, vol. 95, 6 pp. (Jan. 2017).

Kitaev et al., *Classical and Quantum Computation*, vol. GSM 47, American Mathematical Society, 274 pp. (2002).

Singh, "Time Evolution Operators," downloaded from https://medium.com/mdr-inc/time-evolution-operators-be2968493b86, 6 pp. (May 2020).

Wikipedia, "Lieb-Robinson bounds," 5 pp. (document marked: "last edited on Jun. 30, 2020").

Wikipedia, "Quantum circuit," 5 pp. (document marked: "last edited on Mar. 30, 2020").

Office Action Issued in European Patent Application No. 18837006.8, dated Jul. 8, 2021, 6 Pages.

800 

```
┌─────────────────────────────────────┐
│  Generate a quantum circuit program  │
│  for a quantum circuit configured   │
│  to implement a real time evolution │
│  unitary of a Hamiltonian in a      │
│  quantum computing device, wherein  │
│  a unit time evolution unitary      │
│  operator is decomposed into        │
│  overlapping smaller blocks of      │
│  unitary operators - 810            │
└─────────────────────────────────────┘
                  │
                  ▼
┌─────────────────────────────────────┐
│  Configure the quantum circuit to   │
│  implement the real time evolution  │
│  unitary of the Hamiltonian - 812   │
└─────────────────────────────────────┘
```

FIG. 8

QUANTUM SIMULATION OF REAL TIME EVOLUTION OF LATTICE HAMILTONIANS

CROSS-REFERENCE TO RELATED APPLICATIONS

This application claims the benefit of U.S. Provisional Application No. 62/009,651, entitled "QUANTUM SIMULATION OF REAL TIME EVOLUTION OF LATTICE HAMILTONIANS" and filed on Dec. 22, 2017, which is hereby incorporated herein in its entirety.

SUMMARY

In this disclosure, a decomposition of a real time evolution operator $e^{-iTH}$ of any local Hamiltonian H on lattices $\Lambda \subset \mathbb{Z}^D$ into local unitaries based on Lieb-Robinson bounds is analyzed. Combining with recent quantum simulation algorithms for real time evolution, it is observed that the overall quantum circuit complexity of the resulting quantum simulation algorithm is $\mathcal{O}$ (Tn polylog(Tn/$\epsilon$) with depth $\mathcal{O}$ (T polylog(Tn/$\epsilon$)) where n is the space volume or the number of qubits and $\epsilon$ is the accuracy of the simulation in operator norm. Adaptation to time-dependent Hamiltonians is straightforward. Previously discussed quantum algorithms had gate count $\tilde{O}(n^2)$ for constant t and $\epsilon$.

Embodiments of the disclosed technology include a quantum circuit that is configured to implement a real time evolution unitary of a Hamiltonian in a quantum computing device, wherein a unit time evolution unitary operator is decomposed into overlapping smaller blocks of unitary operators. In some implementations, a size of the overlap is proportional to the logarithm of a number of qubits in the simulated system. In certain implementations, a size of the overlap is proportional to the logarithm of a total simulated evolution time. In some implementations, a size of the overlap is proportional to a Lieb-Robinson velocity. Still further, in some implementations, the blocks are chosen according to a 3-colorable cellulation of a simulated two-dimensional system. In certain implementations, the blocks are chosen according to a 4-colorable cellulation of a simulated three-dimensional system. In some implementations, the blocks are chosen according to enlarged cells of a triangulation of a simulated system. Further, in some implementations, the overlap is proportional to the logarithm of the strength of Hamiltonian term. In certain implementations, the blocks are obtained by recursive application of divisions of hyperplanes. In some implementations, the time step is subdivided only for the regions of the system with strong Hamiltonian terms. In certain implementations, the blocks are based at least in part on a Taylor series expansion method. In some implementations, the blocks are based at least in part on a quantum signal processing method.

Further, in some embodiments, a quantum circuit program is generated for a quantum circuit configured to implement a real time evolution unitary of a Hamiltonian in a quantum computing device, wherein a unit time evolution unitary operator is decomposed into overlapping smaller blocks of unitary operators; and the quantum circuit is configured to implement the real time evolution unitary of the Hamiltonian.

The foregoing and other objects, features, and advantages of the disclosed technology will become more apparent from the following detailed description, which proceeds with reference to the accompanying figures.

BRIEF DESCRIPTION OF THE DRAWINGS

FIG. 8 is a flowchart showing an example embodiment for performing the disclosed technology.

DETAILED DESCRIPTION

I. General Considerations

Figure 1:
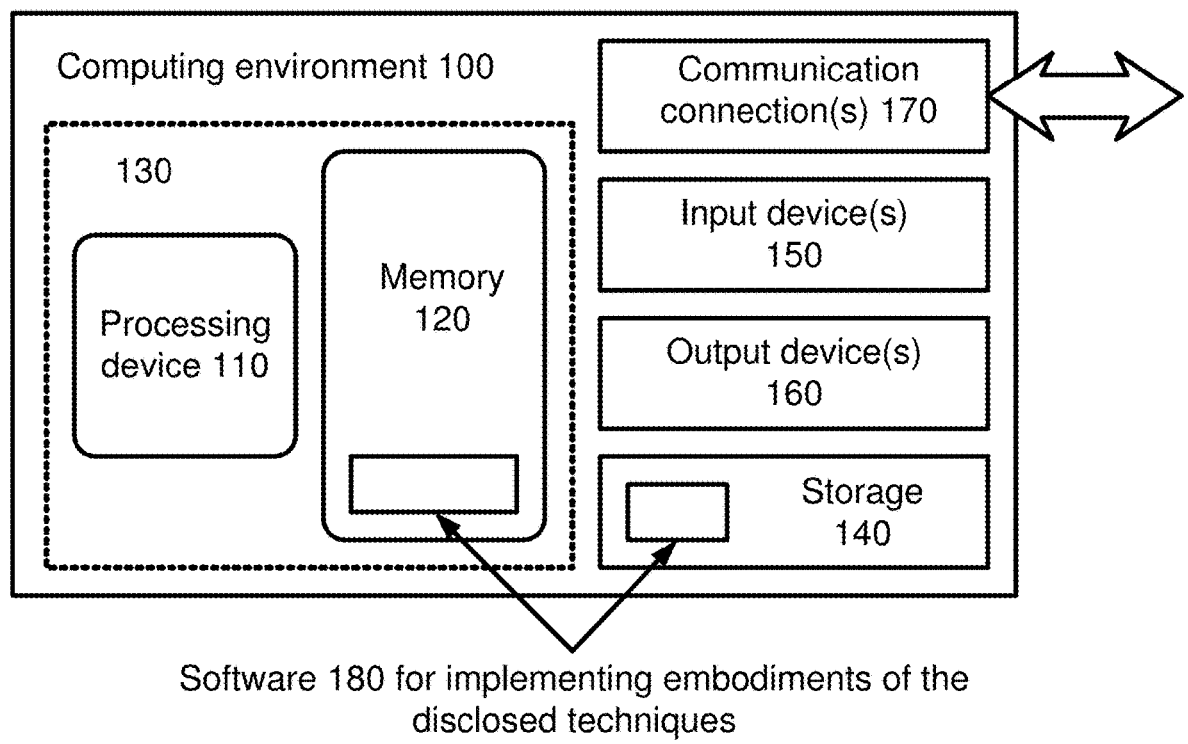
FIG. 1 illustrates a generalized example of a suitable computing environment in which several of the described embodiments can be implemented.

As used in this application, the singular forms "a," "an," and "the" include the plural forms unless the context clearly dictates otherwise. Additionally, the term "includes" means "comprises." Further, the term "coupled" does not exclude the presence of intermediate elements between the coupled items. Further, as used herein, the term "and/or" means any one item or combination of any items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

II. Overview

A Hamiltonian is a hermitian operator H on a Hilbert space that generates the unitary dynamics $U_t^H$ of a system of interacting degrees of freedom by the Schrödinger equation $\partial_t U_t^H = HU_t^H$. It is standard that any physical system can be modeled by a local Hamiltonian, meaning H is a sum of terms, each of which is supported on a ball of small diameter (interaction range) with respect to the natural metric of the space the system lives in. Regarding Nature as a quantum simulator, one expects that the gate complexity of the real time evolution operator should be linear in the spacetime volume. However, so far, quantum algorithms that simulate real time evolution do not achieve this linear scaling. Andrew M. Childs et al., "Toward the first quantum simulation with quantum speedup." Arxiv 1711.10980v1. This is largely because algorithms in Dominic W. Berry et al., "Simulating hamiltonian dynamics with a truncated taylor series," Phys. Rev. Lett. 114, 090502 (2015), Arxiv 1412.4687v1, and Guang Hao Low and Isaac L. Chuang, "Optimal hamiltonian simulation by quantum signal processing," Phys. Rev. Lett. 118, 010501 (2017). Arxiv 1606.02685v2, are for sparse Hermitian matrices, and are not tailored to local Hamiltonians. And intuitive Lie-Trotter-Suzuki expansions might achieve the linear scaling, and indeed it appears to do so empirically, but it not well understood how to analyze error in the expansion. See H. F. Trotter, "On the product of semi-groups of operators," Proceedings of the American Mathematical Society 10, 545-545 (1959); Masuo Suzuki, "General theory of fractal path integrals with applications to many-body theories and statistical physics," Journal of Mathematical Physics 32, 400-407 (1991); and Andrew M. Childs et al., "Toward the first quantum simulation with quantum speedup," Arxiv 1711.10980v1.

Here, Hamiltonians on a lattice of qubits are analyzed with particular emphasis on a decomposition of the time evolution unitary based on Lieb-Robinson bounds (see, e.g., Elliott H. Lieb and Derek W. Robinson, "The finite group velocity of quantum spin systems," Communications in Mathematical Physics 28, 251-257 (1972); M. B. Hastings, "Lieb-schultz-mattis in higher dimensions," Phys. Rev. B 69, 104431 (2004), cond-mat/0305505; Bruno Nachtergaele and Robert Sims, "Lieb-robinson bounds and the exponential clustering theorem," Commun. Math. Phys. 265, 119-130 (2006), math-ph/0506030v3; and Matthew B. Hastings and Tohru Koma, "Spectral gap and exponential decay of correlations," Commun. Math. Phys. 265, 781-804 (2006), math-ph/0507008v3), that is made explicit by Osborne, (Tobias J. Osborne, "The dynamics of 1d quantum spin systems can be approximated efficiently," Phys. Rev. Lett. 97, 157202 (2006), quant-ph/0508031; see also Spyridon Michalakis, "Stability of the area law for the entropy of entanglement," Arxiv 1200.6900v2), which, combined with recent advances (as described in Dominic W. Berry et al., "Simulating hamiltonian dynamics with a truncated taylor series," Phys. Rev. Lett. 114, 090502 (2015), Arxiv 1412.4687v1, and Guang Hao Low and Isaac L. Chuang, "Optimal hamiltonian simulation by quantum signal processing," Phys. Rev. Lett. 118, 010501 (2017), Arxiv 1606.02685v2), gives an algorithm with gate complexity matching Nature's, up to logarithmic factors. Osborne phrased his results in terms of classical simulation of one-dimensional quantum chains, but adaptation to quantum simulation is transparent. The "patching" unitaries in Tobias J. Osborne, "The dynamics of 1d quantum spin systems can be approximated efficiently," Phys. Rev. Lett. 97, 157202 (2006), quant-ph/0508031 and Spyridon Michalakis, "Stability of the area law for the entropy of entanglement," 1206.6900v2, can be simplified by going through the "interaction picture," and, in consequence, make generalizations to higher dimensions easy.

The normalization convention used herein is as follows. Let $H=\sum_{X \subset \Lambda} h_X$ be a local Hamiltonian on a finite lattice $\Lambda \subset \mathbb{Z}^D$ such that $\|h_X\| \leq 1$ for every X. Each term may or may not depend on time. Here, the locality means that $h_X$ is supported on region X, and $h_X=0$ whenever $\text{diam}(X)>1$. These conditions are not restrictions at all since one can rescale the spacetime metric for the norm bound and the locality to hold. More physically speaking, the distance and the norm of Hamiltonian (energy) are not dimensionless quantities, and one can set the units for these properties to hold. The space dimension D is considered constant, and is hence ignored in big-$\mathcal{O}$ notations.

III. Algorithm and Analysis

Figure 5:
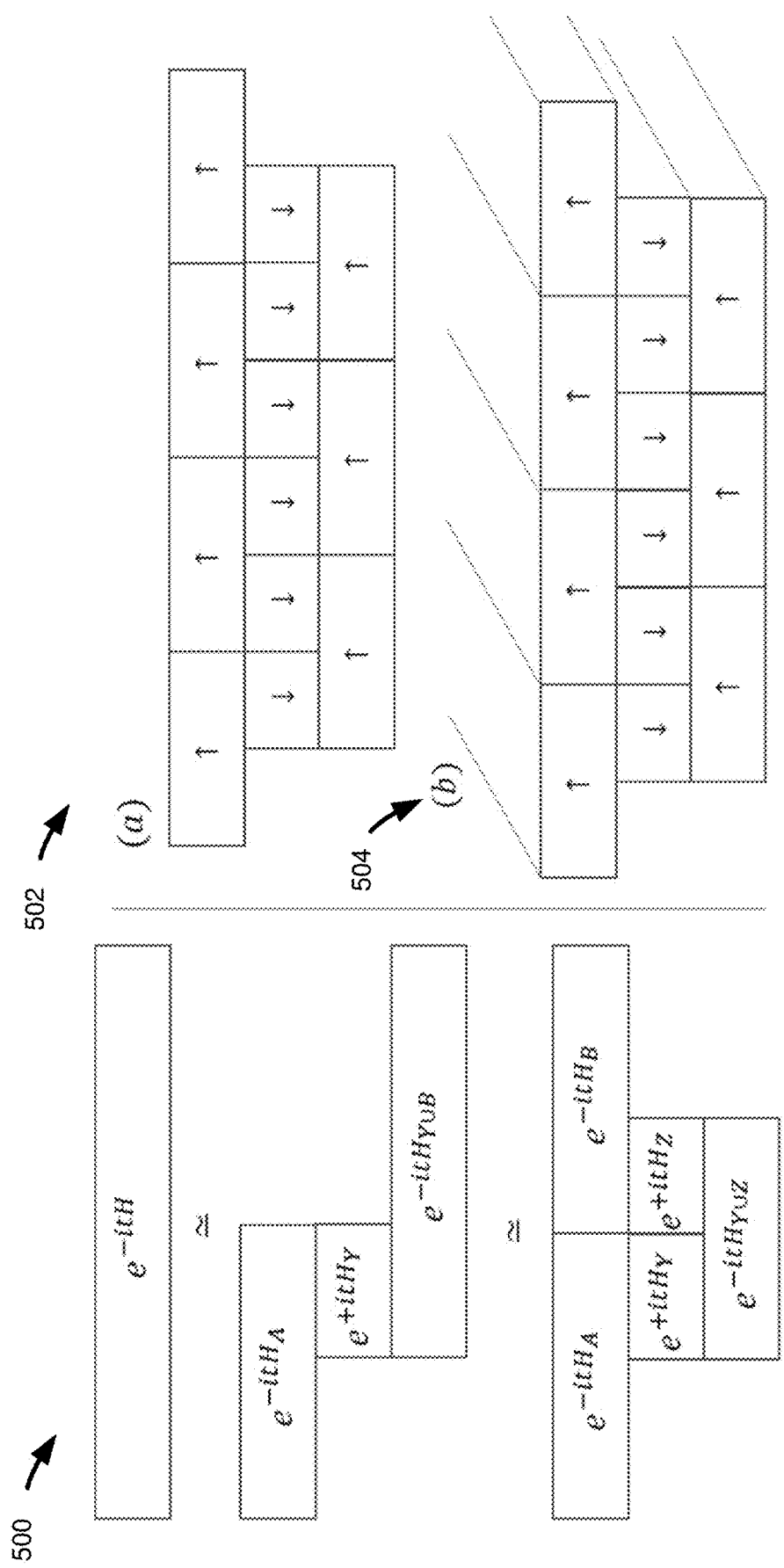
FIG. 5 is a schematic block diagram showing an example decomposition of a time evolution operator for unit time t=O(1).

An example algorithm is depicted in FIG. 5. In particular, FIG. 5 is a schematic block diagram 500 showing an example decomposition of a time evolution operator for unit time t=O(1). The time is going upwards. Each block □ in FIG. 5 represents the forward time evolution, $e^{-itH_\square}$, if the arrow is upward, and the backward time evolution, $e^{+itH_\square}$, if the arrow is downward. Here, $H_\square$ is the sum of local terms in the Hamiltonian supported within the block. The overlap has size l. Portion (a) shown at 502 of FIG. 5 shows a one-dimensional setting, but a generalization to higher D dimensions is readily achieved by regarding each block as a (D−1)-dimensional hyperplane so that the problem reduces to lower dimensions. Portion (b) shown at 504 of FIG. 5 shows a two-dimensional setting. The approximation error from the depicted decomposition is $\epsilon = O(e^{-cl}L^D/l)$ where L is the linear system size, l is the width of the overlap between blocks, and c is a constant that depends only on the locality of the Hamiltonian. One can use any algorithm to further decompose the resulting "small" unitaries on $O(\log(L/\epsilon))$ qubits into elementary gates. To achieve gate count that is linear (up to logarithmic factors) in spacetime volume, the algorithm for simulating the blocks needs to be polynomial in system size and polylogarithmic in accuracy.

The following explains why this algorithm works.

Lemma 1. Let $A_t$ and $B_t$ be continuously time-dependent hermitian operators, and let $U_t^A$ and $U_t^B$ with $U_0^A U_0^B = 1$ be the corresponding time evolution unitaries. Then, (i) $W_t = (U_t^B)^\dagger U_t^A$ is the unique solution of $i\partial_t W_t = ((U_t^B)^\dagger (A_t - B_t) U_t^B) W_t$ and $W_0=1$. (ii) $\|U_t^A - U_t^B\| \leq t\delta$ if $\|A_s - B_s\| \leq \delta$ for all $s \in [0,t]$. Proof. (i) Differentiate. The solution to the ordinary differential equation is unique. (ii) Apply Jensen's inequality for $\|\cdot\|$ (implied by the triangle inequality for $\|\cdot\|$) to the equation $W_t - W_0 = \int_0^t ds \partial_s W_s$. Then, invoke (i) and the unitary invariance of $\|\cdot\|$. □

For any region $Y \subseteq \Lambda$, $H_Y$ denotes the sum $\sum_{X \subseteq Y} h_X$; hence, $H_\Lambda = H$.

Lemma 2 (Lieb-Robinson bound)./Let $O_X$ be any operator. Then, $$\left\|(U_t^H)^\dagger O_X U_t^H - (U_t^{H_\Omega})^\dagger O_X U_t^{H_\Omega}\right\| \leq O(|X|) \|O_X\| \frac{(O(2^D)t)^\ell}{\ell!} \quad (1)$$

where $l=\text{dist}(X, \Lambda \backslash \Omega)$.

Herein, strictly local interactions are considered, but similar results hold with milder locality conditions such as $\|h_X\| \leq e^{-\text{diam}(X)}$ see [Thm. 1] (see also M. B. Hastings, "Locality in quantum systems," (2010), 1008.5137v1.) With exponentially decaying interactions, the bound in the lemma becomes $e^{-\mu l}$ for some $\mu > 0$ for fixed t and D, rather than $\exp(-\mu l \log l)$ in the strictly local interaction case. Below, only the corollary that Eq. (1) is at most $\mathcal{O}(e^{-\mu l})$ for some $\mu > 0$ is used. For slower decaying interactions, the bound is weaker and the overlap size l in FIG. 5 has to be larger.

The analysis of the algorithm is the most clearly understood for a one-dimensional chain. Let L be the length of the chain, so there are $\mathcal{O}(L)$ qubits. Consider a block Y of length l on the left end, and a bridging block X of length 2 that overlaps with both Y and Λ\Y. In addition, call by Z the block of length l inside Λ\Y on the left end, so that Y∪Z has length 2 l.

Here, open boundary conditions are considered, but periodic boundary conditions can be handled similarly. Further, since the lattice is discrete, there can be order 1 discrepancy (subvolume if D>1) when one relates the number of sites in a block and its size. One can ignore such minor offsets.

The "Boundary" Term $$H_{bd} = H - (H_Y + H_{\Lambda\backslash Y}) \quad (2)$$

is then supported on X. The following identity is trivial but important:

$$U_t^H = U_t^{H_Y + H_{\Lambda\backslash Y}} \underbrace{(U_t^{H_Y + H_{\Lambda\backslash Y}})^\dagger U_t^H}_{=W_t}. \quad (3)$$

By Lemma 1 (i), $W_t$ is generated by Tobias J. Osborne, "The dynamics of 1d quantum spin systems can be approximated efficiently," Phys. Rev. Lett. 97, 157202 (2006), quant-ph/ 0508031, and Spyridon Michalakis, "Stability of the area law for the entropy of entanglement," 1206.6900v2.

$$(U_t^{H_Y + H_{\Lambda\backslash Y}})^\dagger H_{bd} U_t^{H_Y + H_{\Lambda\backslash Y}} = \quad (4)$$
$$(U_t^{H_Y + H_Z})^\dagger H_{bd} U_t^{H_Y + H_Z} + \underbrace{\mathcal{O}(\|H_{bd}\| e^t e^{-\mu l})}_{=\delta}$$

where the error term estimate is by Lemma 2 and μ>0 is some constant. By Lemma 1 (i) again, the unitary generated by the first term of (4) is $(U_t^{H_Y+H_Z})^\dagger U_t^{H_{Y\cup Z}}$, which can be thought of as the "interaction picture" tine-evolution operator of the Hamiltonian in (4). This is an example simplification of the "patching" unitary, which is tδ-close to $W_t$ by Lemma 1 (ii). One can iterate the same decomposition for $U_t^{H_{\Lambda\backslash Y}}$, and after L/l such iterations one arrives at FIG. 5. For t=1, the accumulated error is at most δL/l.

Going to higher dimensions D>1, one can first decompose the full time evolution into unitaries on $\mathcal{O}$ (L/l) hyperplanes (codimension 1). This entails error $\mathcal{O}(e^{-\mu l}L^D/l)$ since the boundary term has norm at most $\mathcal{O}(L^{D-1})$. For each hyperplane the decomposition into $\mathcal{O}$ (L/l) blocks of codimension 2 gives error $\mathcal{O}(e^{-\mu l}(lL^{D-2})(L/l))$. Summing up all the hyperplanes, one gets $\mathcal{O}(e^{-\mu l}L^D/l)$ for the second round of decomposition. After D rounds of the decomposition the total error is $\mathcal{O}(e^{-\mu l}DL^D/l)$, and one is left with $\mathcal{O}((L/l)^D)$ blocks of unitaries for t=$\mathcal{O}$ (1). For longer times, apply the decomposition for each factor of $U_T^H = U^H(T,0) = U^H(T,T-t)\ldots U^H(2t,t)U^H(t,0)$.

It remains to implement the unitaries on blocks □ of $\mathcal{O}(l^D)$ qubits where l=$\mathcal{O}$ (log(TL/ε)) for with accuracy ε/TL$^D$. All block has form and one can use any of Hamiltonian simulation algorithms. If one uses an algorithm that is polynomial in the spacetime volume and polylogarithmic in the accuracy such as those based on signal processing or Taylor series then the overall gate complexity is $\mathcal{O}(tL^D \text{polylog}(tL/\epsilon))$ where the exponent in the polylog factor depends on the choice of the algorithm. For not too large system sizes L, it may be reasonable to use a bruteforce method to decompose the block unitaries into elementary gates (see A. Yu. Kitaev et al., Classical and Quantum Computation, Vol. GSM 47, Chap. 8 (American Mathematical Society, 2002).

IV. Inhomogeneous Interaction Strength

One can adapt the decomposition of time evolution unitary based on Lieb-Robinson bounds when there is inhomogeneity in interaction strength across the lattice. For this section, it is not assumed that $\|h_x\| \le 1$ for all $X \subseteq \Lambda$. Instead, suppose there is one term $h_{X_0}$ in the Hamiltonian with $\|h_{X_0}\| = \gg 1$ while all the other terms $h_X$ have $\|h_X\| \le 1$, the prescription above says that one would have to divide the tune step in pieces, and simulate each time slice. However, more careful inspection in the algorithm analysis reveals that one does not have to subdivide the time step for the entire system. For clarity in presentation, focus on a one-dimensional chain where the strong term $h_{X_0}$ is at the middle of the chain. One can then introduce a cut as in portion (a) of FIG. 5 at $h_{X_0}$. The purpose is to put the strong term into $H_{bd}$ so that the truncation error in Eq. (4) is manifestly at most linear in J. Since the truncation error is exponential in l, the factor of J in error can be suppressed by increasing l by $\mathcal{O}$ (log J). After one confines the strong term in a block of size $2l_0 = \mathcal{O}$ (log(JLT/ε)) in the middle of the chain, the rest blocks can be chosen to have size $\mathcal{O}$ (log(LT/ε)) and do not have any strong term, and hence the time step can be as large as it would have been without the strong term. For the block with the strong term, one desirably subdivides the time step by a factor of $\mathcal{O}$ (J).

V. Reducing Number of Layers in Higher Dimensions

Although the spatial dimension D has been treated as a constant, the number of layers for unit time evolution is $3^D$, which grows rather quickly in D, if one used the hyperplane decomposition as above. One can reduce this number by considering a different tessellation of the lattice.

To be concrete, the idea is explained in two dimensions. Imagine tiling of the two-dimensional plane using hexagons of diameter, say, 10 l. It is important that this hexagonal tiling is 3-colorable; one can assign one of three colors, red, green, and blue, to each of hexagons such that no two neighboring hexagons have the same color.

Let R, G, B be the unions of red, green, and blue hexagons, respectively. Each of R, G, B consists of well separated hexagons. Suppose one had implemented the time evolution U(R∪G) for $H_{R\cup G}$. Consider l-neighborhood B$^+$ of B$^+ \cap$(R∪G) consists of separated rings of radius ~6 l and thickness ~l. One can now apply the decomposition (e.g., as in FIG. 5) to R∪G and B$^+$, to complete the unit time evolution for entire system R∪G∪B. The unitaries needed in addition to U(R∪G) is the backward time-evolution on (R∪G)∩B$^+$, which is a collection of disjoint unitaries on the rings, and the forward time-evolution for B$^+$, which is a collection of disjoint unitaries on enlarged hexagons.

The time evolution U(R∪G) is constructed in a similar way. Here, l-neighborhood of G within R∪G is considered. The enlarged part G$^+ \cap$R consists of line segments of thickness l, and it is clear that R\G$^+$ is l-away from G. One can again apply the decomposition as in the examples of FIG. 5.

In summary, the algorithm under the 3-colored tessellation is (i) forward-evolve the blocks in R, (ii) backward-evolve the blocks in R∩G$^+$, (iii) forward-evolve the blocks in G$^+$∩(R∪G), (iv) backward-evolve the blocks in (R∪G∩B$^+$, and (v) forward-evolve the blocks in B$^+$.

In general, if the layout of qubits allows α-colorable tessellation, where α=2, 3, 4, . . . , such that the cells of the same color are well separated, then one can decompose unit time evolution into 2α−1 layers by considering fattened cells of the tessellation. Here, being well-separated means that for any color η, the l-neighborhood of a cell of color η does not intersect with any other cell of color η. The proof is by induction. When α=2, it is clear. For larger α, one can implement the forward-evolution on the union A of α−1 colors using 2α−3 layers by the induction hypothesis, and finish the evolution by backward-evolution on A∩B⁺, where B is the union of the last color and B⁺ is the l-neighborhood of B, and then forward-evolution on B⁺. This results in 2α−1 layers in total.

A regular D-dimensional lattice can be covered with D+1 colorable tessellation. One such coloring scheme is obtained by any triangulation of $\mathbb{R}^D$, and coloring each 0-cell by color "0", and each 1-cell by color "1", and so on, and finally fattening them.

For three dimensions, there exists a more "uniform" 4-colorable tessellation. Consider the body-centered cubic (BCC) lattice, spanned by basis vectors (2, 0, 0), (0, 2, 0), and (1, 1, 1). Color each BCC lattice point p=(x, y, z) by the rule η=x+y+z mod 4. The Voronoi tessellation associated with this colored BCC lattice is a valid 4-colored tessellation for the purpose discussed herein. The shortest vector in the sublattice of the same color has length $2\sqrt{2} \simeq 2.828$, but a cell is contained in a ball of radius $\sqrt{5}/2 \simeq 1.118$, and therefore the cells of the same color are separated.

VI. Numerical Estimation of the Size of the Overlap Between Blocks

To recap, there are two sources of error in the entire algorithm. One is from the decomposition of the full time-evolution operator using Lieb-Robinson bounds into $m = \mathcal{O}(TL^D/l^D)$ blocks, and is bounded from above by $m\epsilon_{LR} = \mathcal{O}(me^{-\mu l})$ for some μ>0. The other is from approximate simulations of the block unitary using the algorithms of Dominic W. Berry et al., "Simulating hamiltonian dynamics with a truncated taylor series," Phys. Rev. Lett. 114, 090502 (2015), Arxiv 1412.4687v1, and Guang Hao Low and Isaac L. Chuang, "Optimal hamiltonian simulation by quantum signal processing," Phys. Rev. Lett. 118, 010501 (2017), Arxiv 1606.02685v2. If each block is simulated up to error $\epsilon_\square$, then the total error ϵ of the algorithm is at most $m(\epsilon_{LR} + \epsilon_\square)$. Thus, one needs $l = \mathcal{O}(\log(TL^D/\epsilon))$.

To gain some sense of constants in the expression $\epsilon_{LR} = \mathcal{O}(me^{-\mu l})$, the error in the decomposition for one-dimensional Heisenberg model on 10 spins with open boundary conditions was numerically computed:

$$H = \sum_{j=1}^{9} \underbrace{\frac{1}{3}(\sigma_j^x \sigma_{j+1}^x + \sigma_j^y \sigma_{j+1}^y + \sigma_j^z \sigma_{j+1}^z)}_{=h_j}. \quad (5)$$

The coefficient 1/3 is to have each term's norm equal to 1. The decomposition (m=1) is $$\exp(-itH) \simeq \exp\left(-it \sum_{j<b} h_j\right) \exp\left(+it \sum_{j=a}^{b-1} h_j\right) \exp\left(-it \sum_{j\geq a} h_j\right) \quad (6)$$

so there are l=b−a+1 spins in the overlap. The error for t=0.50 and t=0.25 was computed, and it was observed that the error is almost independent of the position of the overlap, and is exponentially small in l. See FIGS. 6 and 7.

Figure 6:
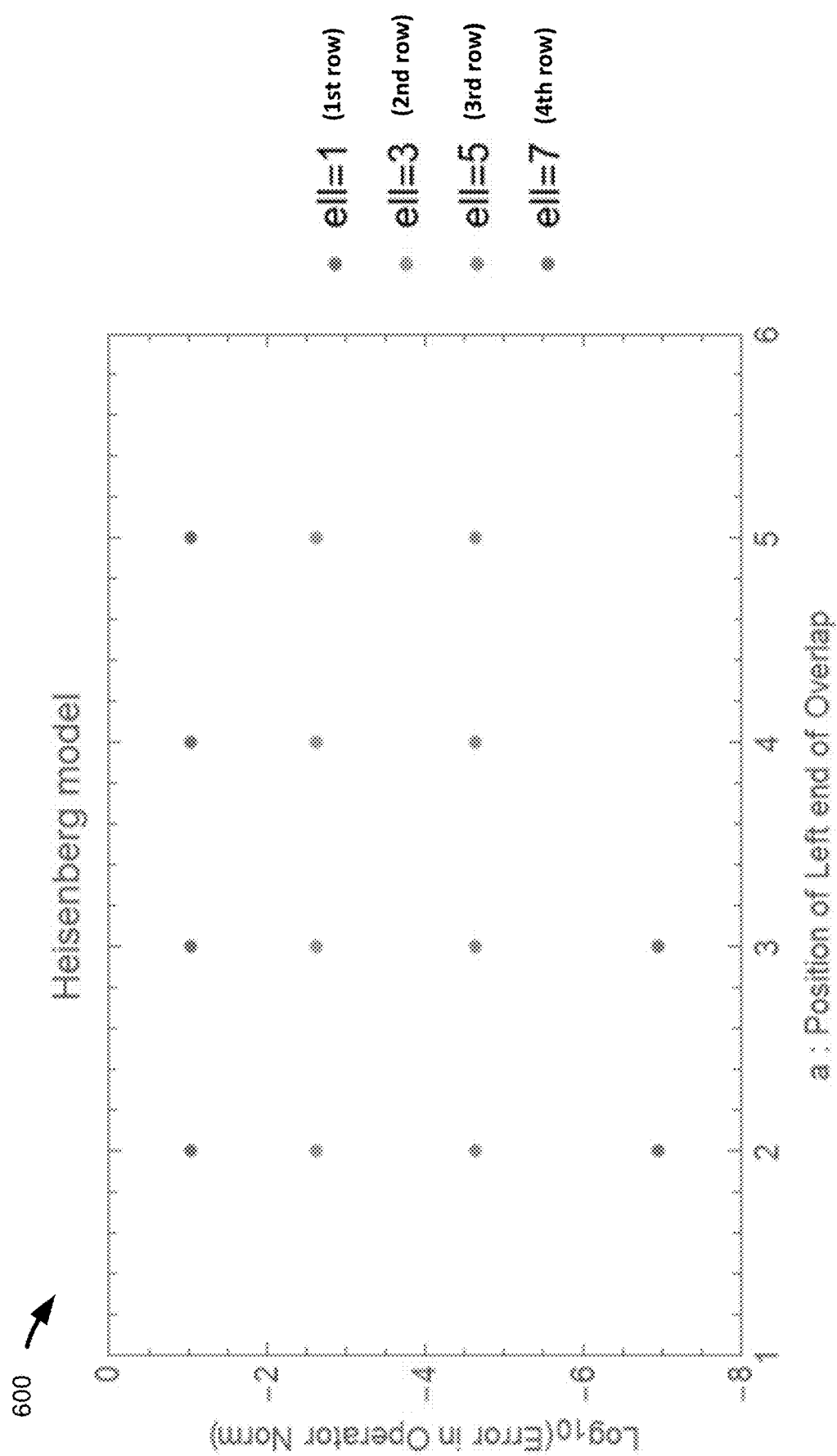
FIGS. 6 and 7 are graphs showing the numerical test of decomposition of real-time evolution operator based on Lieb-Robinson bounds.
Figure 7:
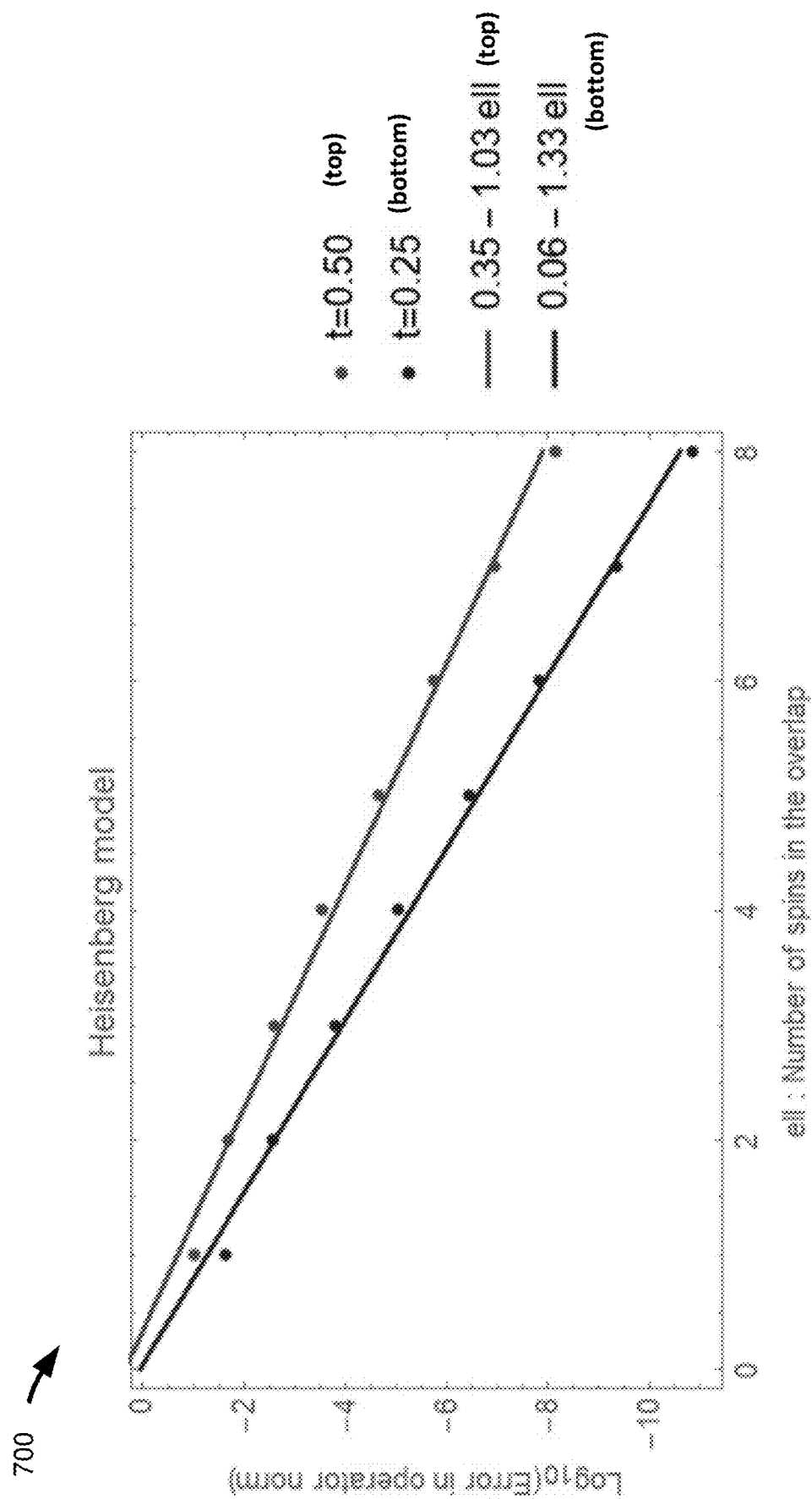

FIGS. 6 and 7 are graphs show the numerical test of decomposition of real-time evolution operator based on Lieb-Robinson bounds. The Hamiltonian is the antiferromagnetic one-dimensional Heisenberg model on 10 spins with open boundary condition. The error of the decomposition in Eq. (6) is almost independent of the position a of the overlap within the system (data shown with t=0.5) as shown in graph 600 of FIG. 6, and is exponentially small in the overlap size l (data shown with a=2), as shown in graph 700 of FIG. 7.

VII. Discussion

In this disclosure, local Hamiltonians on (hyper)cubic lattices embedded in some Euclidean space were analyzed, but Lieb-Robinson bounds with exponential dependence on the separation distance hold more generally. Given an arbitrary Hermitian operator that is a sum of terms, one can define a graph on qubits by defining edges between qubits whenever there is a term of the Hamiltonian acting on the both qubits. The distance is then the minimum number of edges on the path that connects vertices. Sometimes this is called the interaction graph of the Hamiltonian. If the number of paths of a given length between two vertices is at most $e^{cl}$ for some constant c>0 where l is the distance between the two vertices, then Lieb-Robinson bounds holds, and it is possible to decompose the real time evolution operator in a similar fashion as above. Note that, it depends on the expansion property of the interaction graph whether this method eventually gives a better gate count than previous methods do.

Application to fermions is straightforward since Hamiltonian terms always have fermion parity even. Lieb-Robinson bound does not require any modification. If one represents a fermionic Hamiltonian by the Jordan-Wigner transformation (the representation of Clifford algebra), any local operator of odd fermion parity has large support over the qubits, but every local term of the Hamiltonian has local support over the qubits in one spatial dimension. For higher dimensions, the trick of F. Verstraete and J. I. Cirac J. Stat. Mech. (2005) P09012 can be directly applied to implement time evolution for small blocks.

If one uses quantum signal processing algorithm to implement the blocks of size $\mathcal{O}(l^D)$, then $\mathcal{O}(\log l)$ ancilla qubits for a block are needed. Thus, if one does not mind implementing them all in serial, then it follows that the number of ancillas needed is $\mathcal{O}(\log \log(TL/\epsilon))$, which is much smaller than what would be needed if the quantum signal processing algorithm was directly used to simulate the full system.

The decomposition based on Lieb-Robinson bounds looks very similar to higher order Lie-Trotter-Suzuki formulas. The difference is in the fact that the overlap is chosen to be larger and larger (though very slowly) as the simulated spacetime volume increases. This might guide us to understand why Lie-Trotter-Suzuki formulas work well empirically.

VIII. Example Computing Environments

FIG. 1 illustrates a generalized example of a suitable computing environment 100 in which several of the described embodiments can be implemented. The computing environment 100 is not intended to suggest any limitation as to the scope of use or functionality of the disclosed technology, as aspects of the techniques and tools described herein can be implemented in diverse general-purpose or special-purpose environments that have computing hardware.

With reference to FIG. 1, the computing environment 100 includes at least one processing device 110 and memory 120. In FIG. 1, this most basic configuration 130 is included within a dashed line. The processing device 110 (e.g., a CPU or microprocessor) executes computer-executable instructions. In a multi-processing system, multiple processing devices execute computer-executable instructions to increase processing power. The memory 120 may be volatile memory (e.g., registers, cache, RAM, DRAM, SRAM), non-volatile memory (e.g., ROM, EEPROM, dash memory), or some combination of the two. The memory 120 stores software 180 implementing tools for compiling quantum circuits and executing quantum algorithms based at least in part on the techniques described herein.

The computing environment can have additional features. For example, the computing environment 100 includes storage 140, one or more input, devices 150, one or more output devices 160, and one or more communication connections 170. An interconnection mechanism (not shown), such as a bus, controller, or network, interconnects the components of the computing environment 100. Typically, operating system software (not shown) provides an operating environment for other software executing in the computing environment 100, and coordinates activities of the components of the computing environment 100.

The storage 140 can be removable or non-removable, and includes one or more magnetic disks (e.g., hard drives), solid state drives (e.g., flash drives), magnetic tapes or cassettes, CD-ROMs, DVDs, or any other tangible non-volatile storage medium which can be used to store information and which can be accessed within the computing environment 100. The storage 140 can also store instructions for the software 180 implementing the quantum circuits, quantum simulation algorithms, quantum-computer control algorithms, protocols, and/or techniques described herein. The input device(s) 150 can be a touch input device such as a keyboard, touchscreen, mouse, pen, trackball, a voice input device, a scanning device, or another device that provides input to the computing environment 100. The output device(s) 160 can be a display device (e.g., a computer monitor, laptop display, smartphone display, tablet display, netbook display, or touchscreen), printer, speaker, or another device that provides output from the computing environment 100.

The communication connection(s) 170 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods for generating the disclosed quantum circuits, quantum simulation algorithms, quantum-computer control algorithms, protocols, and/or techniques described herein circuits can be described in the general context of computer-readable instructions stored on one or more computer-readable media. Computer-readable media are any available media (e.g., memory or storage device) that can be accessed within or by a computing environment. Computer-readable media include tangible computer-readable memory or storage devices, such as memory 120 and/or storage 140, and do not include propagating carrier waves or signals per se (tangible computer-readable memory or storage devices do not include propagating carrier waves or signals per se).

Various embodiments of the methods disclosed herein can also be described in the general context of computer-executable instructions (such as those included in program modules) being executed in a computing environment by a processor. Generally program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

Figure 2:
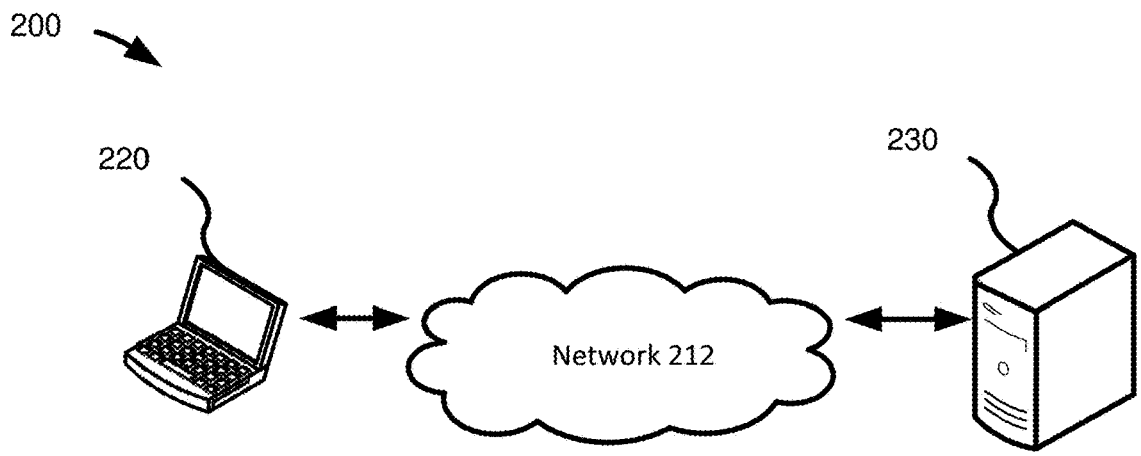
FIG. 2 shows an example of a possible network topology (e.g., a client-server network) for implementing a system according to the disclosed technology.

An example of a possible network topology 200 (e.g., a client-server network) for implementing a system according to the disclosed technology is depicted in FIG. 2. Networked computing device 220 can be, for example, a computer running a browser or other software connected to a network 212. The computing device 220 can have a computer architecture as shown in FIG. 1 and discussed above. The computing device 220 is not limited to a traditional personal computer but can comprise other computing hardware configured to connect to and communicate with a network 212 (e.g., smart phones, laptop computers, tablet computers, or other mobile computing devices, servers, network devices, dedicated devices, and the like). In the illustrated embodiment, the computing device 220 is configured to communicate with a computing device 230 (e.g., a remote server, such as a server in a cloud computing environment) via, a network 212. In the illustrated embodiment, the computing device 220 is configured to transmit input data, to the computing device 230, and the computing device 230 is configured to implement any of the tools and/or techniques disclosed herein and outputting results to the computing device 220. Any of the data received from the computing device 2930 can be stored or displayed on the computing device 2920 (e.g., displayed as data on a graphical user interface or web page at the computing devices 220). In the illustrated embodiment, the illustrated network 212 can be implemented as a Local Area Network (LAN) using wired networking (e.g., the Ethernet IEEE standard 802.3 or other appropriate standard) or wireless networking (e.g. one of the IEEE standards 802.11a, 802.1b, 802.11g, or 802.11n or other appropriate standard). Alternatively, at least part of the network 212 can be the Internet or a similar public network and operate using an appropriate protocol (e.g., the HTTP protocol).

Figure 3:
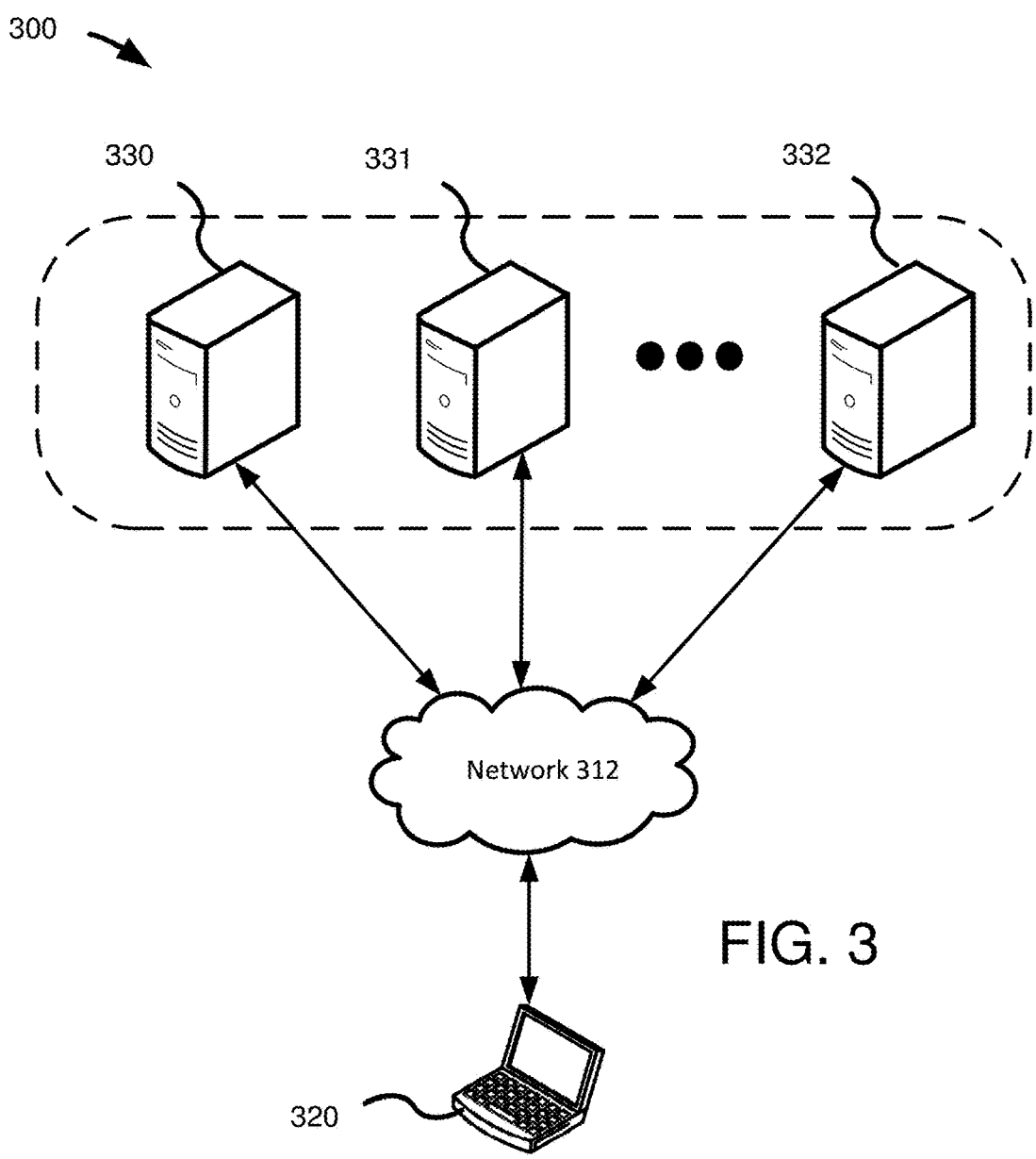
FIG. 3 shows another example of a possible network topology (e.g., a distributed computing environment) for implementing a system according to the disclosed technology.

Another example of a possible network topology 300 (e.g., a distributed computing environment) for implementing a system according to the disclosed technology is depicted in FIG. 3. Networked computing device 320 can be, for example, a computer running a browser or other software connected to a network 312. The computing device 320 can have a computer architecture as shown in FIG. 1 and discussed above. In the illustrated embodiment, the computing device 320 is configured to communicate with multiple computing devices 330, 331, 332 (e.g., remote servers or other distributed computing devices, such as one or more servers in a cloud computing environment) via the network 312. In the illustrated embodiment, each of the computing devices 330, 331, 332 in the computing environment 300 is used to perform at least a portion of any of techniques disclosed herein. In other words, the computing devices 330, 331, 332 form a distributed computing environment in which the quantum circuit generation, quantum simulation, quantum-computer control, and other technique described herein is shared across multiple computing devices. The computing device 320 is configured to transmit input data, to the computing devices 330, 331, 332, which are configured to distributively implement any of the quantum circuit generation, quantum simulation, quantum-computer control, and/or other techniques disclosed herein and to provide results to the computing device 320. Any of the data received from the computing devices 330, 331, 332 can be stored or displayed on the computing device 320 (e.g., displayed as data on a graphical user interface or web page at the computing devices 320). The illustrated network 312 can be any of the networks discussed above with respect to FIG. 2.

Figure 4:
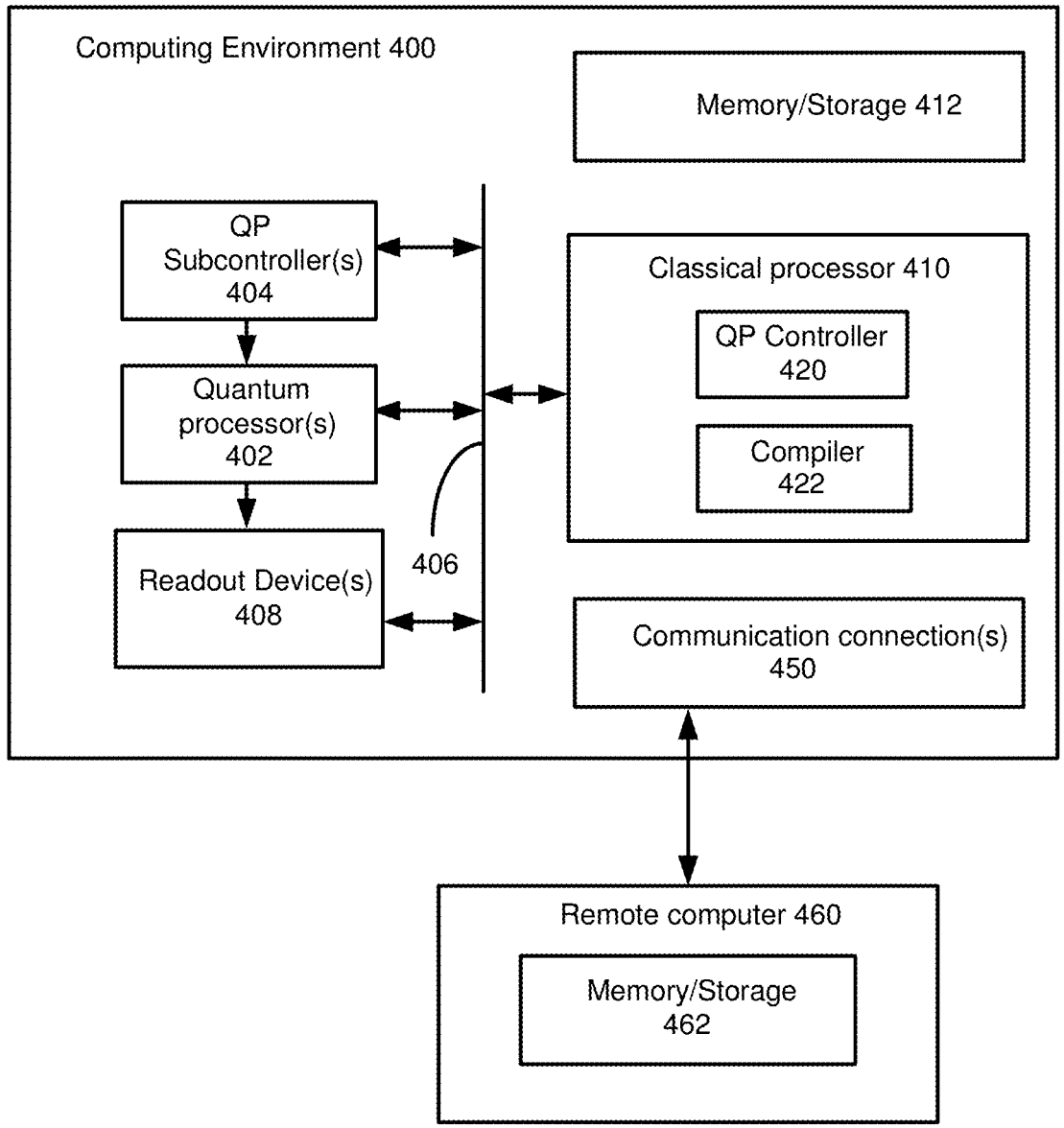
FIG. 4 illustrates an exemplary system for implementing embodiments of the disclosed technology.

With reference to FIG. 4, an exemplary system for implementing embodiments of the disclosed technology includes computing environment 400. In computing environment 400, a compiled quantum computer circuit description, including a circuit description for one or more quantum circuits configured to perform quantum operation based at least in part on the disclosed algorithms and techniques can be used to program (or configure) one or more quantum processing units such that the quantum processing unit(s) implement the circuit described by the quantum computer circuit description.

The environment 400 includes one or more quantum processing units 402 and one or more readout device(s) 408. The quantum processing unit(s) execute quantum circuits that are precompiled and described by the quantum computer circuit description. The quantum processing unit(s) can be one or more of, but are not limited to: (a) a superconducting quantum computer; (b) an ion trap quantum computer; (c) a fault-tolerant architecture for quantum computing; and/or (d) a topological quantum architecture (e.g., a topological quantum computing device using Majorana zero modes). The precompiled quantum circuits, including any of the disclosed circuits or circuits for implementing, the disclosed protocols, can be sent into (or otherwise applied to) the quantum processing unit(s) via control lines 406 at the control of quantum processor controller 420. The quantum processor controller (QP controller) 420 can operate in conjunction with a classical processor 410 (e.g., having an architecture as described above with respect to FIG. 1 and, as expanded on below, potentially being part of a client-server network (as in FIG. 2) or a distributed computing environment (as in FIG. 3)) to implement the desired quantum computing process. Further, the classical processor 410 can be programmed to implement any of the disclosed methods, algorithms, and/or protocols.

In the illustrated example, the QP controller 420 further implements the desired quantum computing process via one or more QP subcontrollers 404 that are specially adapted to control a corresponding one of the quantum processor(s) 402. For instance, in one example, the quantum controller 420 facilitates implementation of the compiled quantum circuit by sending instructions to one or more memories (e.g., lower-temperature memories), which then pass the instructions to low-temperature control unit(s) (e.g., QP subcontroller(s) 404) that transmit, for instance, pulse sequences representing the gates to the quantum processing unit(s) 402 for implementation. In other examples, the QP controller(s) 420 and QP subcontroller(s) 404 operate to provide appropriate magnetic fields, encoded operations, or other such control signals to the quantum processor(s) to implement the operations of the compiled quantum computer circuit description. The quantum controller(s) can further interact with readout devices 408 to help control and implement the desired quantum computing process (e.g., by reading or measuring out data, results from the quantum processing units once available, etc.)

With reference to FIG. 4, compilation is the process of translating a high-level description of a quantum algorithm into a quantum computer circuit description comprising a sequence of quantum operations or gates, which can include quantum circuits generated based at least in part on any of the disclosed algorithms. The compilation can be performed by a compiler 422 using a classical processor 410 (e.g., as shown in FIG. 1) of the environment 400 which loads the high-level description from memory or storage devices 412 and stores the resulting quantum computer circuit description in the memory or storage devices 412.

In other embodiments, compilation can be performed remotely by a remote computer 400 (e.g., a computer having a computing environment as described above with respect to FIG. 1) which stores the resulting quantum computer circuit description in one or more memory or storage devices 462 and transmits the quantum computer circuit description to the computing environment 400 for implementation in the quantum processing unit(s) 402. Still further, the remote computer 400 can store the high-level description in the memory or storage devices 462 and transmit the high-level description to the computing environment 400 for compilation and use with the quantum processor(s). In any of these scenarios, results from the computation performed by the quantum processor(s) can be communicated to the remote computer after and/or during the computation process.

Still further, the remote computer can communicate with the QP controller(s) 420 such that the quantum computing process (including any compilation and/or QP processor control procedures) can be remotely controlled by the remote computer 460. In general, the remote computer 460 communicates with the QP controller(s) 420 and/or compiler/synthesizer 422 via communication connections 450.

In particular embodiments, the environment 400 can be a cloud computing environment, which provides the quantum processing resources of the environment 400 to one or more remote computers (such as remote computer 460) over a suitable network (which can include the internet).

IX. Further Example Embodiments

FIG. 8 is a flowchart 800 showing a generalized example embodiment for implementing an embodiment of the disclosed technology. The particular operations and sequence of operations should not be construed as limiting, as they can be performed alone or in any combination, subcombination, and/or sequence with one another. Additionally, the illustrated operations can be performed together with one or more other operations.

At 810, a quantum circuit program is generated for a quantum circuit configured to implement a real time evolution unitary of a Hamiltonian in a quantum computing device, wherein a unit time evolution unitary operator is decomposed into overlapping smaller blocks of unitary operators.

At 812, the quantum circuit is configured to implement the real time evolution unitary of the Hamiltonian (e.g., using the computing environment of FIG. 4).

In some implementations, a size of the overlap is proportional to the logarithm of a number of qubits in the simulated system. In certain implementations, a size of the overlap is proportional to the logarithm of a total simulated evolution time. In some implementations, a size of the overlap is proportional to a Lieb-Robinson velocity. In certain implementations, the overlap is proportional to the logarithm of the strength of Hamiltonian term.

Further, in some implementations, the blocks are chosen according to a 3-colorable cellulation of a simulated two-dimensional system. In certain implementations, the blocks are chosen according to a 4-colorable cellulation of a simulated three-dimensional system. In some implementations, the blocks are chosen according to enlarged cells of a triangulation of a simulated system.

In certain implementations, the blocks are obtained by recursive application of divisions of hyperplanes. In some implementations, the a time step is subdivided only for the regions of the system with strong Hamiltonian terms.

Still further, in certain implementations, the blocks are based at least in part on a Taylor series expansion method. In some implementations, the blocks are based at least in part on a quantum signal processing method.

As noted, the method can be performed by a computing environment as in FIG. 4. For example, in some embodiments, a system, comprising one or more quantum circuits, and one or more classical computing processors configured to program the quantum circuits to implement a quantum circuit configured to implement a real time evolution unitary of a Hamiltonian in a quantum computing device, wherein a unit time evolution unitary operator is decomposed into overlapping smaller blocks of unitary operators.

Embodiments of the disclosed technology include a quantum circuit that is configured to implement a real time evolution unitary of a Hamiltonian in a quantum computing device, wherein a unit time evolution unitary operator is decomposed into overlapping smaller blocks of unitary operators. In some implementations, a size of the overlap is proportional to the logarithm of a number of qubits in the simulated system. In certain implementations, a size of the overlap is proportional to the logarithm of a total simulated evolution time. In some implementations, a size of the overlap is proportional to a Lieb-Robinson velocity. Still further, in some implementations, the blocks are chosen according to a 3-colorable cellulation of a simulated two-dimensional system. In certain implementations, the blocks are chosen according to a 4-colorable cellulation of a simulated three-dimensional system. In some implementations, the blocks are chosen according to enlarged cells of a triangulation of a simulated system. Further, in some implementations, the overlap is proportional to the logarithm of the strength of Hamiltonian term. In certain implementations, the blocks are obtained by recursive application of divisions of hyperplanes. In some implementations, the time step is subdivided only for the regions of the system with strong Hamiltonian terms. In certain implementations the blocks are based at least in part on a Taylor series expansion method. In some implementations, the blocks are based at least in part on a quantum signal processing method.

X. Concluding Remarks

Having described and illustrated the principles of the disclosed technology with reference to the illustrated embodiments, it will be recognized that the illustrated embodiments can be modified in arrangement and detail without departing from such principles.

The invention claimed is:

1. A quantum computing device, comprising:
at least one quantum circuit configured to implement a real time evolution unitary of a lattice Hamiltonian, wherein a unit time evolution unitary operator is decomposed into overlapping smaller blocks of local unitary operators.

2. The quantum computing device of claim 1,
wherein a size of the overlap is proportional to the logarithm of a number of qubits, and/or
wherein a size of the overlap is proportional to a Lieb-Robinson velocity.

3. The quantum computing device of claim 1, wherein the decomposition into the overlapping smaller blocks of local unitary operators is based on a two-dimensional, 3-colorable cellulation.

4. The quantum computing device of claim 1, wherein the decomposition into the overlapping smaller blocks of local unitary operators is based on a three-dimensional, 4-colorable cellulation.

5. The quantum circuit of claim 1, wherein the blocks are chosen according to enlarged cells of a triangulation.

6. The quantum computing device of claim 1, wherein the overlap is proportional to the logarithm of a magnitude of an associated Hamiltonian term.

7. The quantum computing device of claim 1, wherein the blocks are obtained by recursive application of divisions of hyperplanes.

8. The quantum computing device of claim 1, wherein a time step is subdivided only for selected regions based on magnitudes of associated Hamiltonian terms.

9. The quantum circuit of claim 1, wherein the blocks are based at least in part on a terms in a Taylor series expansion of the lattice Hamiltonian.

10. A method, comprising:
generating a quantum circuit program for a quantum circuit configured to implement a real time evolution unitary of a lattice Hamiltonian in a quantum computing device, wherein a unit time evolution unitary operator is decomposed into overlapping smaller blocks of unitary operators; and
configuring the quantum circuit to implement the real time evolution unitary of the lattice Hamiltonian.

11. The method of claim 10,
wherein (a) a size of the overlap is proportional to the logarithm of a number of qubits or (b) a size of the overlap is proportional to a Lieb-Robinson velocity.

12. The method of claim 10,
the decomposition into overlapping smaller blocks of local unitary operators is based on a two-dimensional, 3-colorable cellulation or according to a three-dimensional, 4-colorable cellulation.

13. The method of claim 10, wherein the blocks are chosen according to enlarged cells of a triangulation.

14. The method of claim 10, wherein the overlap is proportional to the logarithm of a magnitude of a Hamiltonian term.

15. The method of claim 10, wherein the blocks are obtained by recursive application of divisions of hyperplanes.

16. The method of claim 10, wherein a time step is subdivided only for selected regions.

17. The method of claim 10, wherein the blocks are based at least in part on a Taylor series expansion of the lattice Hamiltonian.

18. A system, comprising:
one or more quantum circuits; and
one or more classical computing processors configured to program the quantum circuits to implement a real time evolution unitary of a lattice Hamiltonian, wherein a unit time evolution unitary operator is decomposed into overlapping smaller blocks of unitary operators.

19. The system of claim 18, wherein (a) a size of the overlap is proportional to the logarithm of a number of qubits or (b) a size of the overlap is proportional to a Lieb-Robinson velocity.

* * * * *